United States Patent
Sandoval (12) 
(10) Patent No.: US 10,220,232 B2
(45) Date of Patent: Mar. 5, 2019

(54) JUMPING ROPE WITH WIRELESS SPEAKERS

(71) Applicant: Eric Sandoval, Henderson, NV (US)

(72) Inventor: Eric Sandoval, Henderson, NV (US)

( * ) Notice: Subject to any disclaimer, the term of this patent is extended or adjusted under 35 U.S.C. 154(b) by 11 days.

(21) Appl. No.: 15/652,248

(22) Filed: Jul. 18, 2017

(65) Prior Publication Data

US 2019/0022448 A1    Jan. 24, 2019

(51) Int. Cl.
*A63B 5/20* (2006.01)
*G06F 3/16* (2006.01)
*H04R 1/02* (2006.01)
*A63B 71/06* (2006.01)

(52) U.S. Cl.
CPC ............ *A63B 5/20* (2013.01); *A63B 71/0622* (2013.01); *G06F 3/165* (2013.01); *H04R 1/028* (2013.01); *A63B 2071/0625* (2013.01); *A63B 2220/56* (2013.01); *A63B 2220/62* (2013.01); *A63B 2225/50* (2013.01); *A63B 2230/06* (2013.01); *A63B 2230/30* (2013.01); *A63B 2230/50* (2013.01); *A63B 2230/75* (2013.01); *H04R 2420/07* (2013.01)

(58) Field of Classification Search
CPC ... A63B 5/20; A63B 2225/50; A63B 2230/06; A63B 2230/30; A63B 2230/75; A63B 2230/50; A63B 2220/62; A63B 2220/56; A63B 5/00; A63B 5/205; A63B 5/22; A63B 71/0622–2071/0625; H04R 1/028; H04R 2420/07
See application file for complete search history.

(56) References Cited

U.S. PATENT DOCUMENTS

| | | | | | |
|---|---|---|---|---|---|
| 5,533,947 | A * | 7/1996 | Tomlinson | ............... | A63B 5/20 482/6 |
| 6,001,048 | A * | 12/1999 | Taylor | ...................... | A63B 5/20 446/242 |
| 6,409,636 | B1 * | 6/2002 | Risso | ...................... | A63B 5/20 482/3 |
| 6,540,649 | B1 * | 4/2003 | Niedrich | .................. | A63B 5/20 482/109 |
| 7,354,383 | B2 * | 4/2008 | Bardha | .................... | A63B 5/20 482/81 |
| 9,370,727 | B2 * | 6/2016 | Deluz | .................... | A63H 33/26 |
| 9,427,614 | B1 * | 8/2016 | Washington | .......... | F21V 33/008 |
| 2005/0054483 | A1 * | 3/2005 | Peng | ........................ | A63B 5/20 482/4 |
| 2005/0192164 | A1 * | 9/2005 | Epstein | .................... | A63B 5/20 482/83 |
| 2005/0288158 | A1 * | 12/2005 | LaTour | ................... | A63B 5/20 482/81 |
| 2010/0160116 | A1 * | 6/2010 | LaTour | ................... | A63B 5/20 482/8 |
| 2011/0130247 | A1 * | 6/2011 | Lovett | ..................... | A63B 5/20 482/3 |
| 2013/0288860 | A1 * | 10/2013 | Massey | ................... | A63B 5/20 482/82 |

(Continued)

*Primary Examiner* — Jennifer M Deichl
(74) *Attorney, Agent, or Firm* — Gokalp Bayramoglu (57) ABSTRACT

A jump rope device including a rope portion, a first handle disposed on a first end of the rope portion, and a second handle disposed on a second end of the rope portion. A wireless speaker is disposed inside at least one of the first handle and the second handle. The wireless device is configured to connect to a music device.

16 Claims, 6 Drawing Sheets

(56) References Cited

U.S. PATENT DOCUMENTS

| | | | |
|---|---|---|---|
| 2017/0021224 A1* | 1/2017 | Barton | A63B 21/4035 |
| 2017/0028241 A1* | 2/2017 | Nurse | A63B 5/20 |
| 2017/0043217 A1* | 2/2017 | Lee | G06F 19/3481 |
| 2017/0249446 A1* | 8/2017 | Wright | G06F 19/3481 |

* cited by examiner

JUMPING ROPE WITH WIRELESS SPEAKERS

FIELD OF THE INVENTION

The present invention relates to the field of sports equipment, particularly to a jumping rope with an inbuilt wireless speaker.

BACKGROUND

People of all age groups perform different types of exercises to keep their body fit both physically and mentally. Many people go to gym for exercise, running or play some sport like soccer, basketball, etc. Rope skipping is a simple and effective, aerobic exercise for all age groups. While sports like soccer and basketball keeps a person fully involved and entertained during play time, most of the people listen to music while doing exercises like rope skipping, running etc. Generally, people use wired or wireless earphones, connected to a mobile phone or a music device, to listen music while rope skipping. While exercising via rope skipping, the person is required to jump continuously. These continuous jumps may cause the earphones, mobile phone or music device to fall during skipping, thus providing unwanted interruptions in the exercise. Further, to control volume, changing a song, playing or pausing the music, the person need to stop exercise. Traditionally, people take manual count of the number of steps while skipping. Keeping the count manually is usually inconvenient and it shifts the concentration from exercise and may produce manual error. As an alternative while an individual may wear other devices for counting the steps, this means additional device on a body. Therefore, there is a need for a jumping rope that can perform various functions that does not exist in current jumping ropes.

SUMMARY

Various embodiments provide a rope skipping device with a speaker in-built in the handle.

In one of the embodiment, the jump rope device includes a rope portion, a first handle disposed on a first end of the rope portion, and a second handle disposed on a second end of the rope portion. A wireless speaker is disposed inside at least one of the first handle or the second handle. The wireless speaker is configured to connect to a music device.

In another embodiment, the jump rope device may further include a controller disposed in said at least one of the first handle or the second handle; and a control panel disposed on an outer surface of said at least one of the first handle or the second handle. The controller is configured to perform multiple operations including controlling a volume of the speaker, selecting a sound file to be played from the music device, playing the sound file, pausing the sound file, changing the sound file or connecting the wireless device with the music device and an operation is selected by a user by providing an input from the control panel.

In another embodiment, the jump rope device may further include a heartbeat sensor disposed inside at least one of the first handle and the second handle. The heartbeat sensor may be configured to measure the heartbeat of the user, and the heartbeat sensor may be configured to be activated using the control panel.

In another embodiment, the jump rope device may further include a blood pressure sensor disposed inside at least one of the first handle and the second handle. The blood pressure sensor may be configured to measure the blood pressure of the user, wherein the blood pressure sensor may be configured to be activated using the control panel.

In another embodiment, the jump rope device may further include a body temperature sensor disposed inside at least one of the first handle and the second handle. The body temperature sensor may be configured to measure the body temperature of the user. The body temperature sensor may be configured to be activated using the control panel.

In another embodiment, the input may be determined by a number of squeezes performed on the first handle, a number of squeezes performed on the second handle and a duration of each squeeze.

In another embodiment, the input may further be determined by a relative position of the squeeze on the first handle or the second handle.

In another embodiment, a single squeeze of less than a predetermined duration performs an operation of playing or pausing a current sound file, a double squeeze on the first handle performs an operation for moving to a next sound file, a double squeeze on the second handle performs an operation for moving to a previous sound file, and a single squeeze of more than the predetermined duration performs an operation of switching on or off the speaker and the wireless device.

In another embodiment, the jump rope device may further include a LED screen to display exercise data including a total time of exercise, a number of calories burnt and health statistics of the user.

In another embodiment, the control panel may be a touch screen display configured to take the input from the user, where the input includes an exercise duration, name of the user, age of the user and gender of the user.

In another embodiment, the controller may set an alarm to indicate a lapse of the exercise duration input by the user.

In another embodiment, the controller may be configured to automatically count and indicate a number of skipping steps during the exercise.

In another embodiment, the wireless speaker may be disposed inside a package, and the package may be detachably attached to at least one of the first handle or the second handle.

In another embodiment, the music device may also be disposed inside the package.

In another embodiment, the music device may be disposed inside the first handle or the second handle.

In another embodiment, the package may include a magnet and the package may be attached to the first handle by magnetic force.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION OF THE INVENTION

Figure 1:
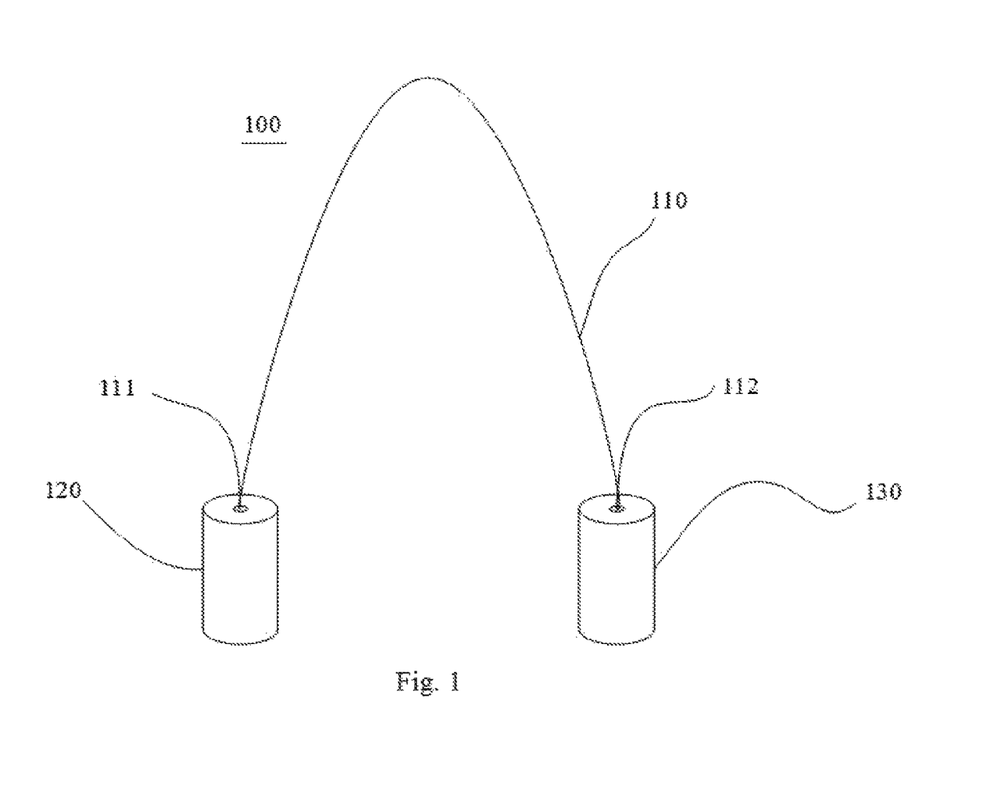
FIG. 1 shows a perspective view of a jump rope device.

Referring to FIG. 1, a jump rope device 100 includes a rope portion 110, a first handle 120 disposed on a first end 111 of the rope portion 110, and a second handle 130 disposed on a second end 112 of the rope portion. The first handle 120 and the second handle 130 are formed in a hollow cylindrical shape.

Figure 2:
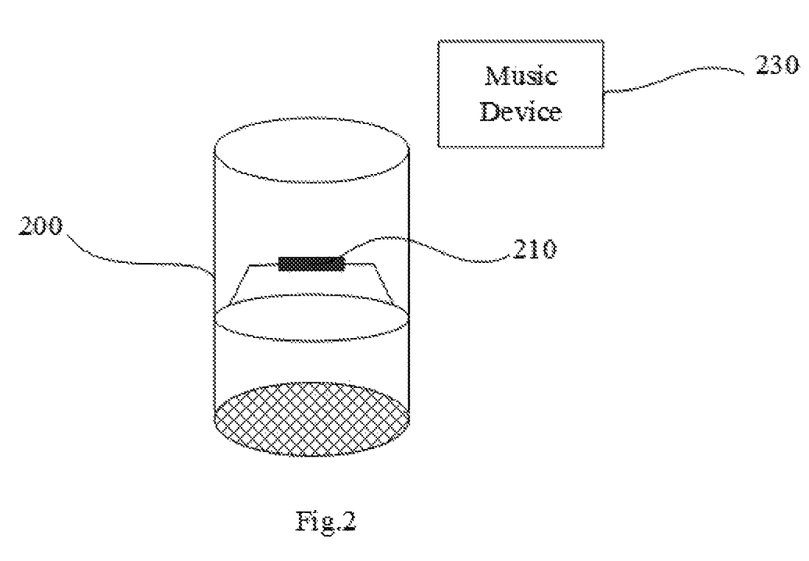
FIG. 2 shows a perspective view of a handle of the jump rope device.

Further referring to FIG. 2, a handle 200 is shown. The handle 200 can be the first handle 120 or the second handle 130 of the jump rope device 100. A wireless speaker 210 is disposed inside the handle 200. The wireless speaker 210 is configured to connect to a music device 230. The music device 230 can be a smartphone, mp4 player, a laptop, tv etc. Alternatively, music device 230 can be included inside the handle 200 and forms a part of the jump rope device 100.

Figure 3:
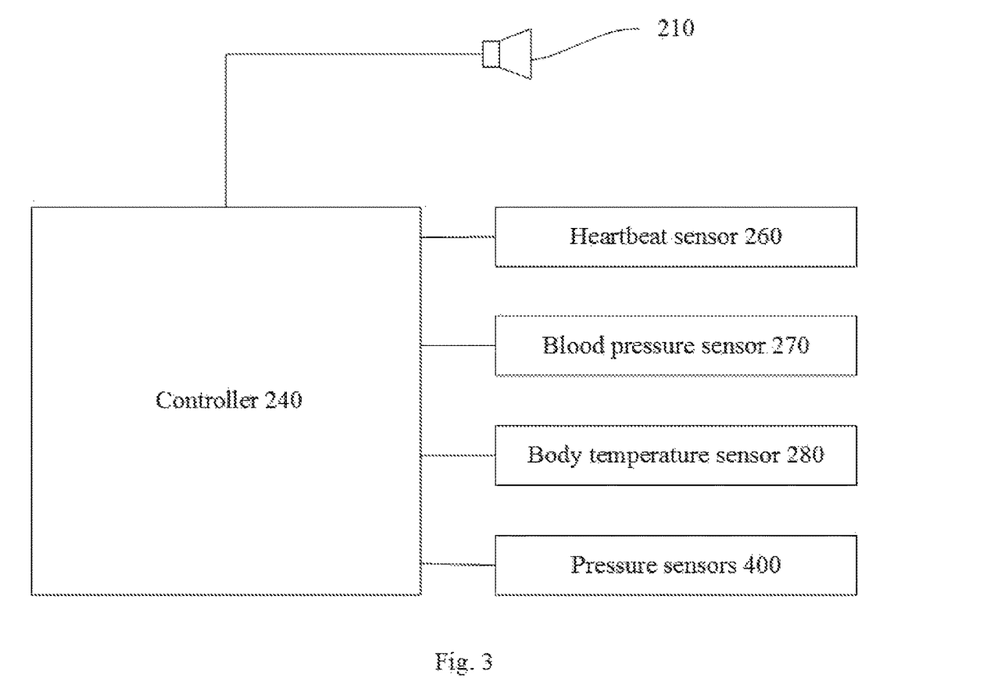
FIG. 3 shows a block diagram of the interior of the handle in accordance with an embodiment of the invention.

Further referring to FIG. 3, in another embodiment, the handle 200 further includes a controller 240 disposed inside the handle 200. A control panel 250 is disposed on an outer surface of the handle 200. The controller 240 is configured to perform multiple operations including controlling a volume of the wireless speaker 210, selecting a sound file to be played from the music device 230, playing the sound file, pausing the sound file, changing the sound file or connecting the wireless speaker 210 with the music device 230 etc. A user can select the operation to be performed by providing an input from the control panel 250.

In another embodiment, the jump rope device 100 further includes a heartbeat sensor 260 disposed inside handle 200. The heartbeat sensor 260 is configured to measure the heartbeat of the user, and the heartbeat sensor can be activated or deactivated using the control panel 250.

In another embodiment, the jump rope device 100 further includes a blood pressure sensor 270 disposed inside the handle 200. The blood pressure sensor 270 is be configured to measure the blood pressure of the user, and the blood pressure sensor 270 can be activated or deactivated using the control panel 250.

In another embodiment, the jump rope device 100 further includes a body temperature sensor 280 disposed inside handle 200. The body temperature sensor 280 is configured to measure the body temperature of the user. The body temperature sensor 280 can be activated or deactivated using the control panel 250.

Figure 4:
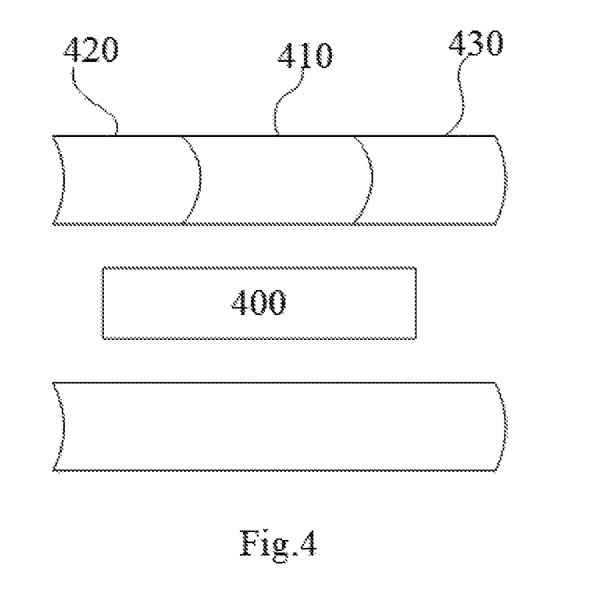
FIG. 4 shows an exploded view of the handle according to an embodiment of the invention.

Further referring to FIG. 4, in another embodiment, the handle 200 is made of flexible material. The handle 200 is provided with pressure sensors 400 to detect the squeezes applied on the outer surface of the handle 200. An input to the controller 240 is provided by the user by squeezing the handle 200. The operation to be performed by the controller is determined by a number of squeezes performed on the first handle 120, the number of squeezes performed on the second handle 130 and a duration of each squeeze. For example, a single squeeze of less than 2 seconds performs an operation of playing or pausing a current sound file, a double squeeze on the first handle 120 performs an operation for moving to a next sound file, a double squeeze on the second handle 130 performs an operation for moving to a previous sound file, and a single squeeze of more than 2 seconds performs an operation of switching on or off the speaker and the wireless speaker 210.

The operation can further be determined by a relative position of the squeeze on the handle 200. For example, a single squeeze in a center position 410 of the handle 200 plays or pauses a current sound file, a single squeeze at a first end 420 of the handle 200 acts as a forward control and plays a next sound file, a single squeeze at a second end 430 of the handle 200 acts as a rewind button and plays the previous sound file, a single squeeze hold for a long time say more than 2 seconds at the center position 410 powers on or off the wireless speaker 210 etc.

Figure 5:
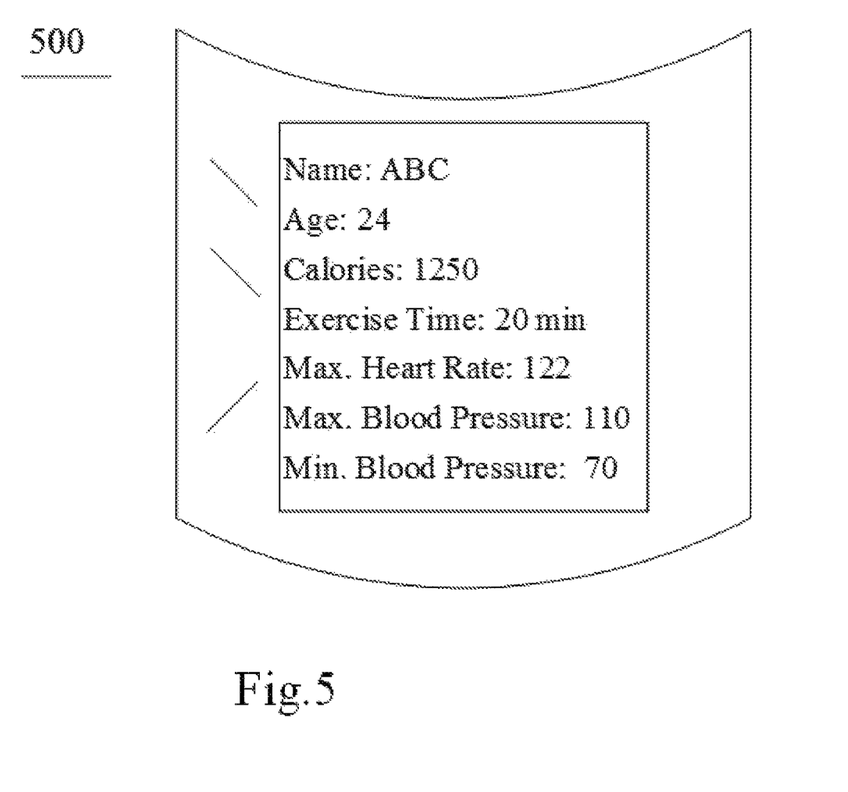
FIG. 5 shows an extended view of an outer surface of the handle in accordance with an embodiment of the invention.

Further referring to FIG. 5, in another embodiment, the jump rope device further includes a LED screen 500 to display exercise data. The exercise data may include total time of exercise, number of calories burnt and health statistics of the user during exercise like maximum heartbeat rate, maximum or minimum blood pressure reached during the exercise.

In another embodiment, the LED screen 500 is a touch screen display configured to take the input from the user. The user can set an exercise duration, name of the user, age of the user, gender of the user etc. through the touch screen display.

In another embodiment, the user may set an alarm to remind the completion of the exercise. For example, if a user wants to do skipping exercise for 20 minutes, the user will input 20 minutes as the exercise duration. After completion of the 20 minutes, the controller will set an alarm to indicate the user that the user has exercised for 20 minutes.

In another embodiment, the controller may be configured to automatically count and indicate the number of skipping steps during the exercise. The user need not to manually count the skipping steps while exercising. A sensor is provided to count and monitor the rotations of the rope portion. Alternatively, the first handle or the second handle may include an accelerometer to detect the rotations of the rope portion. For example, at the end of the exercise controller will display the total number of steps during the exercise on the LCD display screen. Alternatively, if user want to do 100 skipping steps, user can input the number of steps before starting exercise and the controller will indicate through the alarm that user has completed the 100 skipping steps of exercise. The controller is further configured to calculate the number of calories burned. The controller uses the total exercise or total number of steps during the exercise, along with a predetermined calorie coefficient to calculate the total number of calories burned during the exercise. The calorie coefficient is defined based on the age, gender and other physical parameters of the user.

Figure 6:
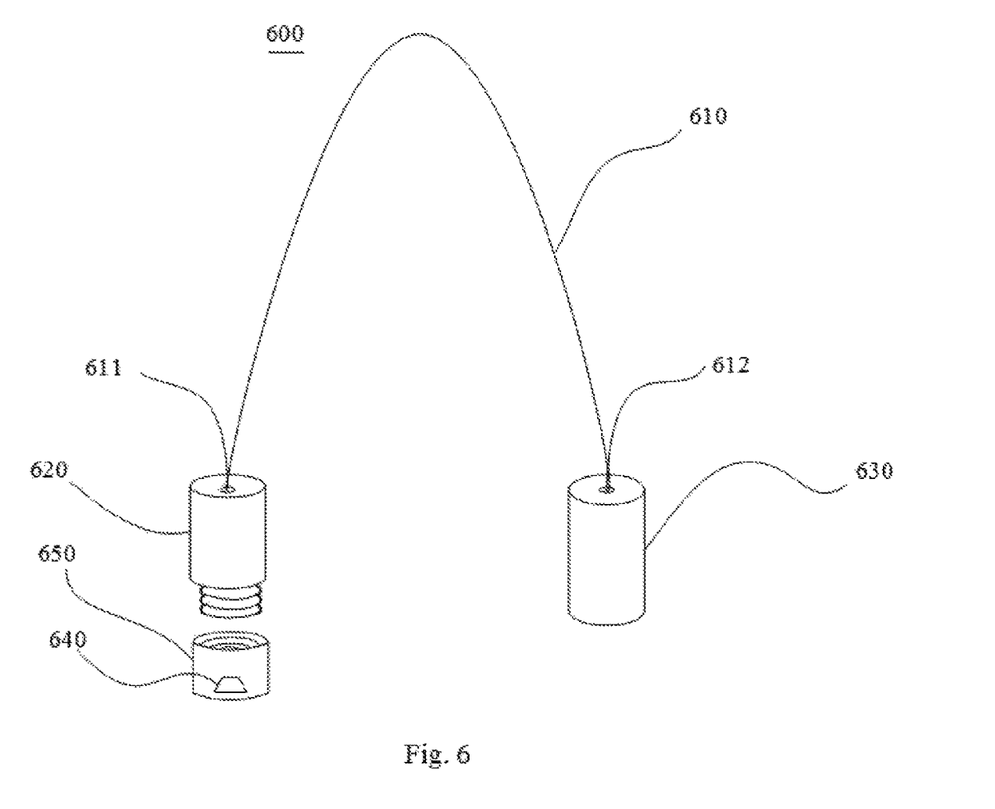
FIG. 6 shows a perspective view of an embodiment of the jump rope device.

Further referring to FIG. 6, a jump rope device 600 includes a rope portion 610, a first handle 620 disposed on a first end 611 of the rope portion 610, and a second handle 630 disposed on a second end 612 of the rope portion 610. A wireless speaker 640 disposed in a package 650. The package 650 can be detachably connected to the first handle 620, the second handle 630 or both. The package 650 connected to the first handle 620 by a magnetic force. Alternatively, screw threads are provided on the outer surface of the first handle 620 and the inner surface of the package 650 or vice versa and the package can be simply attached to the first handle by screwing. Other variations may be used to achieve the detachable connection.

The invention described herein is susceptible to variations, modifications and/or additions other than those specifically described and it is to be understood that the invention includes all such variations, modifications and/or additions which fall within the spirit and scope of the above description.

What is claimed is:
1. A jump rope device, comprising:
a rope portion;

a first handle disposed on a first end of the rope portion;

a second handle disposed on a second end of the rope portion; and a wireless speaker disposed inside at least one of the first handle and the second handle;

wherein, the wireless speaker is configured to connect to a music device;

a controller disposed in said at least one of the first handle or the second handle; and wherein the controller is configured to perform multiple operations including controlling a volume of the speaker, selecting a sound file to be played from the music device, playing the sound file, pausing the sound file, changing the sound file or connecting to a wireless device with the music device; wherein an input is determined by a number of squeezes performed on the first handle, a number of squeezes performed on the second handle and a duration of each squeeze.

2. The jump rope device according to claim 1, further comprising a heartbeat sensor disposed inside at least one of the first handle and the second handle, wherein the heartbeat sensor is configured to measure the heartbeat of a user, wherein the heartbeat sensor is configured to be activated using a control panel.

3. The jump rope device according to claim 1, further comprising a blood pressure sensor disposed inside at least one of the first handle and the second handle, wherein the blood pressure sensor is configured to measure the blood pressure of a user, wherein the blood pressure sensor is configured to be activated using a control panel.

4. The jump rope device according to claim 1, further comprising a body temperature sensor disposed inside at least one of the first handle and the second handle, wherein the body temperature sensor is configured to measure the body temperature of a user, wherein the body temperature sensor is configured to be activated using a control panel.

5. The jump rope device according to claim 1, wherein the input is further determined by a relative position of the squeeze on the first handle or the second handle.

6. The jump rope device according to claim 1, wherein a single squeeze of less than a predetermined duration performs an operation of playing or pausing a current sound file, a double squeeze on the first handle performs an operation for moving to a next sound file, a double squeeze on the second handle performs an operation for moving to a previous sound file, and a single squeeze of more than the predetermined duration performs an operation of switching on or off the speaker and the wireless device.

7. The jump rope device according to claim 1, further comprising a LED screen to display exercise data including a total time of exercise, a number of calories burnt and health statistics of a user.

8. The jump rope device according to claim 1, further comprising a control panel; wherein the control panel is a touch screen display configured to take the input from a user, where the input includes an exercise duration, name of the user, age of the user and gender of the user.

9. The jump rope device according to claim 8, wherein the controller sets an alarm to indicate a lapse of the exercise duration input by the user.

10. The jump rope device according to claim 1, wherein the controller is configured to automatically count and indicate a number of skipping steps during the exercise.

11. The jump rope device according to claim 1, wherein the wireless speaker is disposed inside a package and wherein the package is detachably attached to at least one of the first handle or the second handle.

12. The jump rope device according to claim 11, wherein the music device is disposed inside the package.

13. The jump rope device according to claim 11, wherein the music device is disposed inside the first handle or the second handle.

14. The jump rope device according to claim 11, wherein the package includes a magnet and the package is attached to the first handle by magnetic force.

15. A jump rope device, comprising:

a rope portion;

a first handle disposed on a first end of the rope portion;

a second handle disposed on a second end of the rope portion; and a wireless speaker disposed inside at least one of the first handle and the second handle;

wherein, the wireless speaker is configured to connect to a music device;

wherein an input is determined by a number of squeezes performed on the first handle, a number of squeezes performed on the second handle and a duration of each squeeze.

16. The jump rope device according claim 15, wherein a single squeeze of less than a predetermined duration performs an operation of playing or pausing a current sound file, a double squeeze on the first handle performs an operation for moving to a next sound file, a double squeeze on the second handle performs an operation for moving to a previous sound file, and a single squeeze of more than the predetermined duration performs an operation of switching on or off the speaker and a wireless device.

* * * * *